United States Patent [19]

Gable

[11] 4,253,188
[45] Feb. 24, 1981

[54] CLOCK SYNCHRONIZATION FOR DATA COMMUNICATION RECEIVER

[75] Inventor: Melvin G. Gable, Ypsilanti, Mich.

[73] Assignee: Ford Motor Company, Dearborn, Mich.

[21] Appl. No.: 46,571

[22] Filed: Jun. 7, 1979

[51] Int. Cl.³ ............................................. H04L 3/00
[52] U.S. Cl. .................................................... 375/110
[58] Field of Search ............... 375/110, 116, 111, 114; 178/118; 235/474; 360/51

[56] References Cited

U.S. PATENT DOCUMENTS

| | | | |
|---|---|---|---|
| 3,838,214 | 9/1974 | Lind | 375/110 |
| 4,010,421 | 3/1977 | Lind | 375/110 |
| 4,083,005 | 4/1978 | Looschen | 375/110 |

Primary Examiner—Thomas A. Robinson
Attorney, Agent, or Firm—Peter Abolins; Clifford L. Sadler

[57] ABSTRACT

With respect to a synchronous communications receiver, this specification discloses a decoder for generating a clock signal to synchronize the receiver with the information data rate of the received signal. The implementation of a decoder apparatus as a periodic finite state machine allows a clock signal to be extracted from the energy or transitions of the encoded signal. Such a decoder can define clock information over a large range of data rates. A bandpass filter tuned to the characteristic frequency being received can be coupled to the input of the decoder to limit the synchronization range to that desired by the receiver.

8 Claims, 5 Drawing Figures

FINITE STATE DECODER WITH INTERFERENCE DETECTOR

FINITE STATE DECODER WITH INTERFERENCE DETECTOR

STATE DIAGRAM OF FINITE STATE DECODER

CLOCK SYNCHRONIZATION FOR DATA COMMUNICATION RECEIVER

BACKGROUND OF THE INVENTION

1. Field of the Invention

The present invention relates to a synchronous data communication receiver and the apparatus required to obtain clock synchronization.

2. Prior Art

The need for having a clock signal for use with encoded information is explained in U.S. Pat. No. 3,238,462 issued Mar. 1, 1966 and entitled "Synchronous Clock Pulse Generator", the disclosure of which is hereby incorporated by reference.

With respect to prior art relating to a synchronous communication receiver, decoding starts with the extraction of a timing signal and reconstructing a clock signal. One method to accomplish this is to use the waveform edges of the signal to trigger one-shot response circuits. Noise displaced crossings induce trigger problems with this scheme. Another scheme is to use the waveform edges to trigger an astable multivibrator or a phase-lock loop clock. However, noise still introduces multiple crossings and produces timing jitter. If the free-running clock frequency differs from the incoming data rate then a phase error will occur and will increase with the time between transitions. That is, the phase error, delta $\theta$, over the free-running time "T" in radians is:

$$\text{delta } \theta = 2\pi \text{ (delta F) (T)}$$

$$\text{delta } F = Fd = Fc/N$$

where:
N number of bit clock periods/data cell
Fd is the data symbol frequency
Fc is the clock oscillator frequency The stability of the oscillator is dependent on the maximum allowable phase error. One implementation of the oscillator is using a multivibrator which is an analog device and suffers from external timing component selection and frequency drifting. An alternative implementation of the oscillator is to use a stable reference clock, such as a crystal generator, and a frequency divider. Operating the clock at an integer multiplier of the data symbol rate produces clock pulses each differing by a small fixed phase shift. The synchronization logic selects the clock whose phase is most closely matched to the data transition timing. Nevertheless, an integer multiple or discrete phase error will exist between the synchronized clock signal and the date symbol rate.

A received signal with interfering noise produces a synchronization clock with noise induced jitter. The effect of noise on timing jitter can be studied by looking at the noise signal near the limiter threshold level. If a signal, with a finite rate of change near the threshold level, has a noise sample amplitude of delta V which occurred at time "T1 minus delta-T", it will displace the zero crossing by "minus delta T" time.

A reduction in timing jitter may be accomplished by passing the signal through a bandpass filter tuned to the frequency of the data symbol rate. A limiter following the filter will eliminate the amplitude variations so that only perturbation of phase remain. These phase variations represent the timing jitter. However, any improvement in jitter performance results in a longer synchronization period or acquisition time. This is one of the problems this invention overcomes.

When the noise signal level becomes a significant fraction of the data signal level, then multiple zero crossings can occur and the timing signals become useless. This thresholding effect is a function of the signal to noise ratio and is characteristic of synchronization circuits. In the end, a trade off must be made between an acceptable jitter performance and the time necessary to acquire synchronization.

Ideally, time information or the reconstruction of a clock should be extracted from the power or the energy within the waveform instead of from the leading and trailing edges of the signal. Internal bit phase variations should not affect the correlation function of the decoder. The use of proper bandpass filters should not increase the bit synchronization acquistion time. Noise may be described by the distribution of noise power to frequency or the power spectrum. The input power to the receiver is characterized by:

$$(S(t)+N(t))^2 = S(t)^2 + 2S(t)N(t) + N(t)^2$$

where:
S(t)=input signal
N(t)=input noise

If the noise is small compared to the signal, then the product S(t) N(t), which is the signal to noise term, introduces noise terms at the sum and difference frequencies of the signal and noise. A bandpass filter tuned to the signal's characteristic frequency will see only terms which are in the vicinity of the delta-F band of that filter. The bandpass filter has an equivalent noise bandwidth Bn. If the delta-F is small, that is to say the bandpass filter is narrow, then the spectral noise power input to the decoder can be reduced.

In the prior art of synchronous digital communications these methods have been employed for obtaining bit synchronization and in reducing noise induced timing jitter. These designs require that the receiver will synchronize with a known data rate. This rate is used in the design to determine the local oscillator frequency of operation.

SUMMARY OF THE INVENTION

A receiver in accordance with an embodiment of this invention extracts the data rate from the waveform being received thus eliminating the problems of timing jitter and clock synchronization. For a communication receiver to synchronize with the transmitted data rate requires clock synchronization. A synchronous data receiving system usually uses a local receiving oscillator such as a phase lock loop circuit for this clock synchronization. The elimination of such an oscillator can be accomplished by employing a finite-state decoder. Such a decoder derives the clock by processing the received code through a periodic finite state machine apparatus which extracts the timing information from the energy or transitions of the encoded signal. The states within the machine determine the receiver's decoded output. Since the machine is periodic it will pass at least twice through one of its states. The transition through this state defines the receiver's data clock signal.

The decoding apparatus requires the use of code redundancy in the received signal. This redundancy is necessary to produce sufficient energy or sufficient amplitude transitions in the received signal so that it can be processed by a periodic finite state machine. Thus, such an apparatus is capable of deriving clock information from a large range of transmitted rates. The synchronization range is only limited to the bandpass characteristics of the amplifier stages in the receiver. Hence, a bandpass filter tuned to the characteristic frequency being transmitted can be deliberately used in conjunction with the decoder to limit the synchronization range to that desired by the receiver.

DESCRIPTION OF THE SPECIFIC EMBODIMENTS

Figure 1:
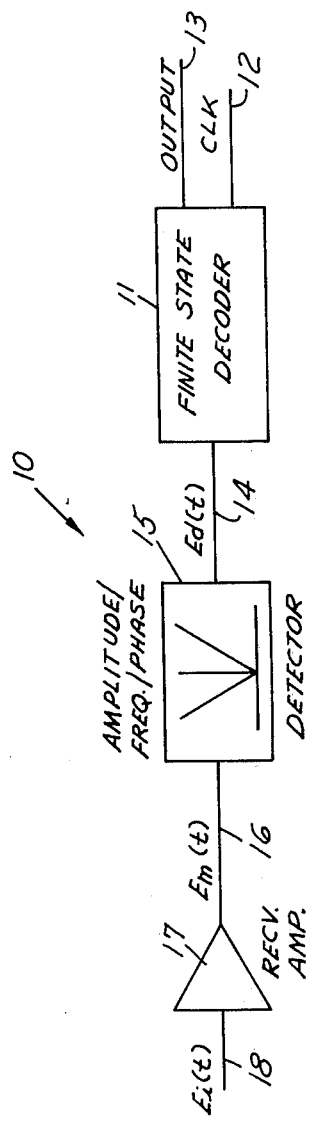
FIG. 1 is a generalized diagram of a communication receiver which incorporates an amplitude, frequency or phase detection that provides encoded information to be processed by the finite-state decoder, in accordance with an embodiment of this invention.

In reference to FIG. 1, the clocking of received information by a receiver 10 including a finite state decoder 11 is determined by processing the code sequence through a sequential state machine. The states within the sequential machine define receiver 10's output (on line 13). The sequential machine used in decoder 11 must be periodic such that it will pass at least twice through one of its states. This unique state change is used to define the transition of receiver 10's data clock (on line 12). The various state transitions of the machine are defined by changes in frequency, phase, amplitude or energy detected within the received signal. Hence, if the encoded signal is amplitude, frequency or phase modulated a detector 15 is required to produce a demodulated signal Ed(t) (on line 14) which represents the direct encoded information to be processed by finite state decoder 11. However, if the information is transmitted by pulse code modulation (PCM) or by direct code sequence, then the output Em(t) (on line 16) from a receiver amplifier 17 may be coupled directly to finite state decoder 11. Since a detector is not required, Ei(t) (on line 18) is the modulated or direct encoded information transmitted on the communication medium. Receiver amplifier 17 represents a wideband amplifier for a PCM system or the IF amplifier stages in a frequency translated system which employs a mixer. As is well known, a mixer is a module which converts an incoming RF signal to a lower intermediate frequency IF output.

The employment of finite state decoder 11 requires the use of code redundancy in the transmitted data. A system which employs code redundancy, encodes information such that it takes more bandwidth in transmitting its information than would otherwise be required. This redundancy produces sufficient frequency, phase, amplitude or energy transitions in the received signal such that it can be processed by a sequential state machine. This redundancy will either result in a reduction of the information rate (i.e., 1/6 rate codes) or an increase in bandwidth on the channel.

Figure 2:
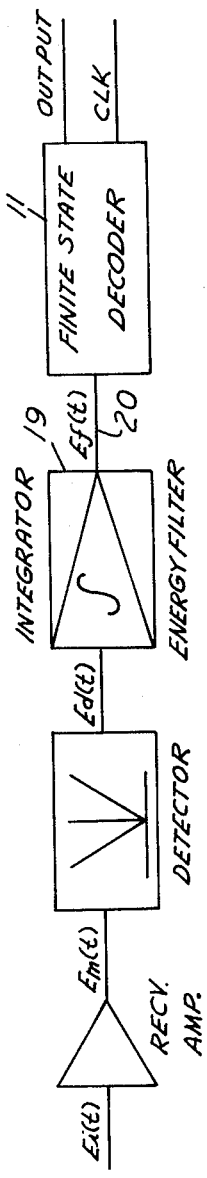
FIG. 2 shows an energy filter which enhances the signal-to-noise ratio of the receiver before being processed by the decoder.

Finite state decoder 11 may be further adapted to include an energy filter 19 as shown in FIG. 2. Energy filter 19 performs the function of input signal Ed(t) (on line 141) integration to produce the output Ef(t) (on line 20). Such an energy filter 19 will enhance the signal-to-noise ratio of the received signal before the received signal is processed by decoder 11.

Figure 3:
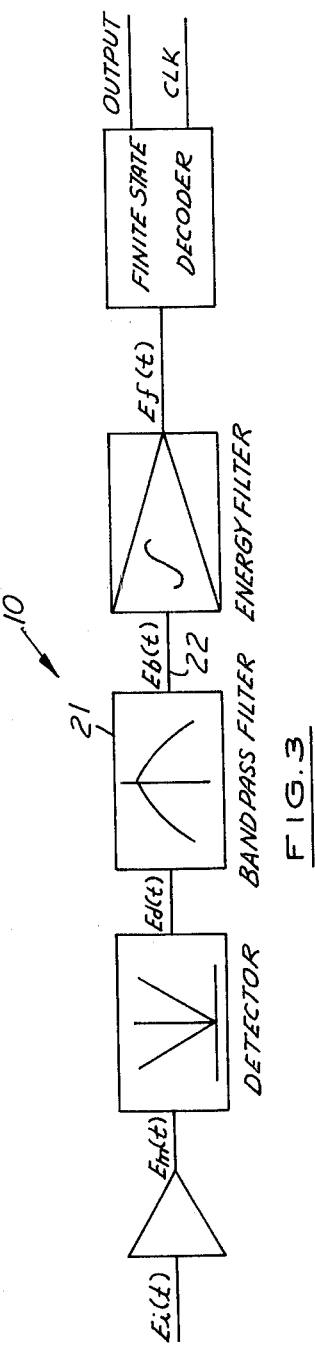
FIG. 3 shows a bandpass filter used in conjunction with the decoder to limit the synchronous detection range to that desired by the receiver.

Finite state decode 11 in FIG. 3 can perform clock synchronization over an unlimited range of data rates. Therefore, it may be necessary to limit the range of acquisition by a bandpass filter 21. Bandpass filter 21, tuned to the characteristic frequency to be received, can be used in conjunction with decoder 11 to limit the synchronization range to that desired by receiver 10.

SELECTED IMPLEMENTATION

Figure 4:
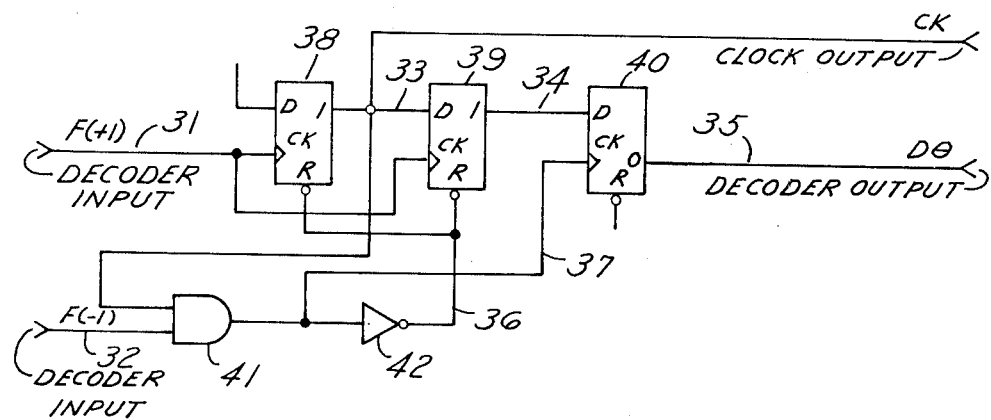
FIG. 4 is a diagram of a particular embodiment of a finite-state decoder implemented with conventional integrated circuits.

With the foregoing description of the invention, the following will describe one selected implementation of finite state decoder 11. This description will be based on conventional integrated circuit devices as shown in FIG. 4. This implementation uses a binary digital information decoder whose output format is either a "zero" or a "one" state. The encoded received signal of a canonical "zero" form is represented by the sequence $+1$, $0$, $+1$, $-1$, $0$, $-1$ and a "one" is represented by the sequence $+1$, $+1$, $0$, $0$, $-1,-1$. Since the code sequence is ternary, it is first amplified by a differential amplifier (not shown) which separates the positive and negative signal elements. The positive output $F(+1)$ (on line 31) as well as the negative output $F(-1)$ (on line 32) from the differential amplifier are then processed by the finite state decoder in FIG. 4. The output (on line 33) of a first flip-flop 38 is connected to the input of a second flip-flop 39. Hence, when the second flip-flop 39 is clocked, it will take on the previous state of the first flip-flop 38. The low to high transition of the $F(+1)$ signal (on line 31) will clock the first flip-flop 38 and the second flip-flop 39. When the first flip-flop 38 is set, then the $F(-1)$ signal (on line 32) is used to reset both flip-flops 38 and 39 through an inverter buffer 42. The signal from an AND gate 41 is used to clock a third flip-flop 40 which stores the current decoded output state (on line 35). The serial clock output state (on line 33) is obtained by the transition of the first flip-flop 38.

Figure 5:
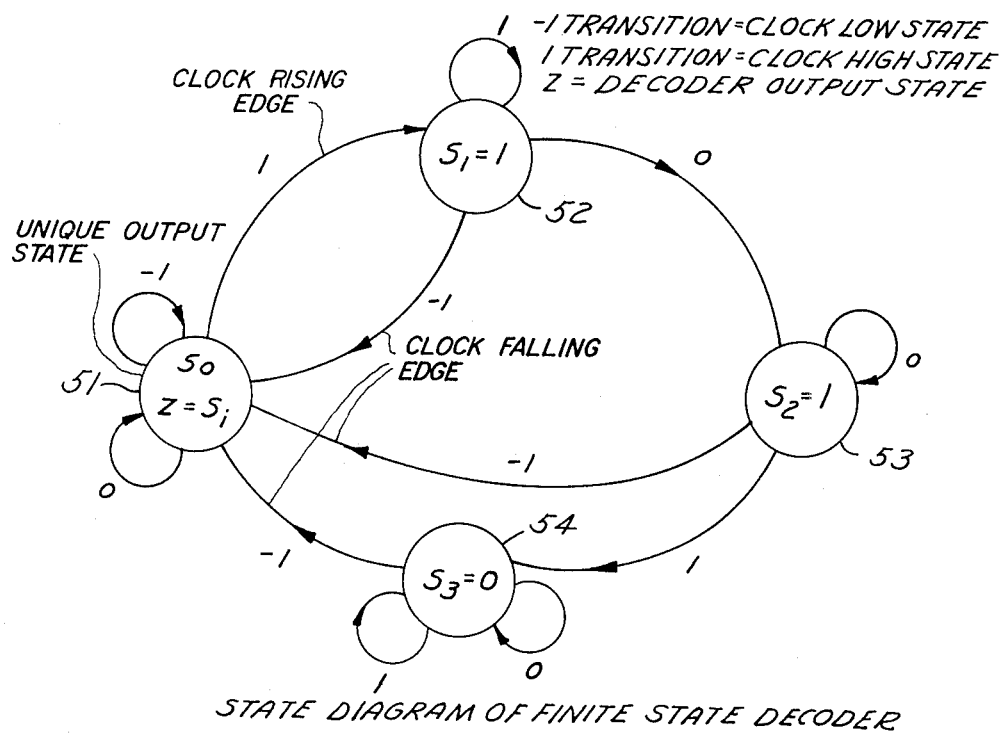
FIG. 5 is a state diagram of the periodic finite state decoder represented in FIG. 4.

The clock in the decoder of FIG. 4 is derived through the processing of the code through a finite state machine which is periodic. FIG. 5 defines a sequential machine "M" such that given an initial state, Si, the state "S" of machine "M" is reached after any finite input sequence. This state "S" which defines the decoder output, depends only on the initial state and on the length of the received sequence. A component machine whose output at any time is independent of the input is called an autonomous clock. The maximal autonomous clock corresponds to the smallest closed partition of the input to machine "M". If "M" is a strongly connected machine, then any component induced by a closed partition on the states of "M" will be strongly connected together. The autonomous clock of a strongly connected machine is also a periodic machine. If the clock has "N" states then during N+1 units it must pass at least twice through one of its states. The period "P" is equal to the smaller of N of all closed partitions of machine "M".

The autonomous clock of the proposed machine "M" can be defined by the state diagram in FIG. 5.

So = initial state
Z = Autonomous clock output
W = Data symbol rate

The synchronous data rate "W" of the clock will be derived from the machine "Si" (on line 51) state changes. The positive transition of the clock "W" is defined as the state change from "So" (on line 51) to "S1" (on line 52) and the falling edge of the clock as state changes from "S1" (on line 52) or "S2" (on line 53) or "S3" (on line 54) to the state "So" (on line 51). Notice that the canonical form of "zero" and "one" have the general form "1, a, b, c, d, −1". Hence, all valid codes will generate at least a synchronous data clock.

A data communication system suitable for use with this invention is further described in a copending application entitled "Communication Broadcast Channel Interface", (Ser. No. 46,578) filed on even data herewith, assigned to the assignee of this application, the disclosure of which is hereby incorporated by reference.

Various modifications and variations will no doubt occur to those skilled in the various art to which this invention pertains. For example, the particular implementation of the concepts discussed above may be varied from that disclosed herein. These and all other variations which basically rely on the teachings through which this disclosure has advanced the art are properly considered with the scope of this invention as defined by the appended claims.

I claim:

1. A synchronous data communication receiver adapted to be connected to a communication medium, said receiver comprising:
    a decoding means for performing a decoding process by extracting signal information from a received signal with code redundancy wherein a periodic finite state machine is used to provide synchronous timing information thereby eliminating the need for an oscillator timing means for generating internal timing to the decoder process.

2. A synchronous data communication receiver as recited in claim 1 wherein:
    said decoding means includes energy filter means whereby the energy in the waveform is used to provide timing information to the decoder process.

3. A synchronous data communication receiver as recited in claim 1 wherein:
    said decoding means includes amplitude detector means whereby the amplitude encoding of the code redundancy in the waveform is used to provide timing information to the decoder process.

4. A synchronous data communication receiver as recited in claim 1 wherein:
    said decoding means includes phase detector means whereby the phase encoding in the waveform is used to provide timing information to the decoder process.

5. A synchronous data communication receiver as recited in claim 1 wherein:
    said decoding means includes frequency detector means whereby the frequency encoding of the waveform is used to provide timing information to the decoder process.

6. A synchronous data communication receiver as recited in claim 1 wherein:
    said decoding means includes a bandpass filter means for limiting the synchronization range of said decoder to a predetermined range desired by the receiver.

7. A synchronous data communication receiver as recited in claim 1 wherein said periodic finite state machine has a plurality of states to determine the synchronous data communication receiver's decoded output, transition through only one of said states defining the receiver's data clock signal.

8. A synchronous data communication receiver as recited in claim 7 wherein said periodic finite state machine has four states, S0, S1, S2 and S3 and said state machine is adapted to process an input sequence which is ternary, −1, 0, +1, said periodic finite state machine sequentially switching among said four states, state S0 producing a clock output so that leaving state S0 causes a data clock to go from a low to a high state and returning to state S0 from any other state causes the data clock to go from the high state to its low state;
    said periodic finite state machine having an output of 1 in state S1, an output of 1 in state S2, an output of 0 in state S3, and an output in state S0 the same as the output of the previous state;
    state S0 being adapted to receive an input signal and remain in state S0 if the input signal is 0 or −1 and go to state S1 if the input signal is +1;
    state S1 being adapted to receive an input signal and remain in state S1 if the input signal is +1, go to state S0 if the input is −1, and go to state S2 if the input signal is 0;
    state S2 being adapted to receive an input signal and remain in state S2 if the input signal is 0, go to state S0 if the input signal is −1, and go to state S3 if the input signal is +1; and
    state S3 being adapted to receive an input signal and remain in state S3 if the input signal is either 0 or 30 1, and go to state S0 if the input signal is −1.

* * * * *